Nov. 30, 1926.
VAN DON HARLAN
DRUM FOR COTTON CLEANERS
Filed Feb. 25, 1926
1,608,653
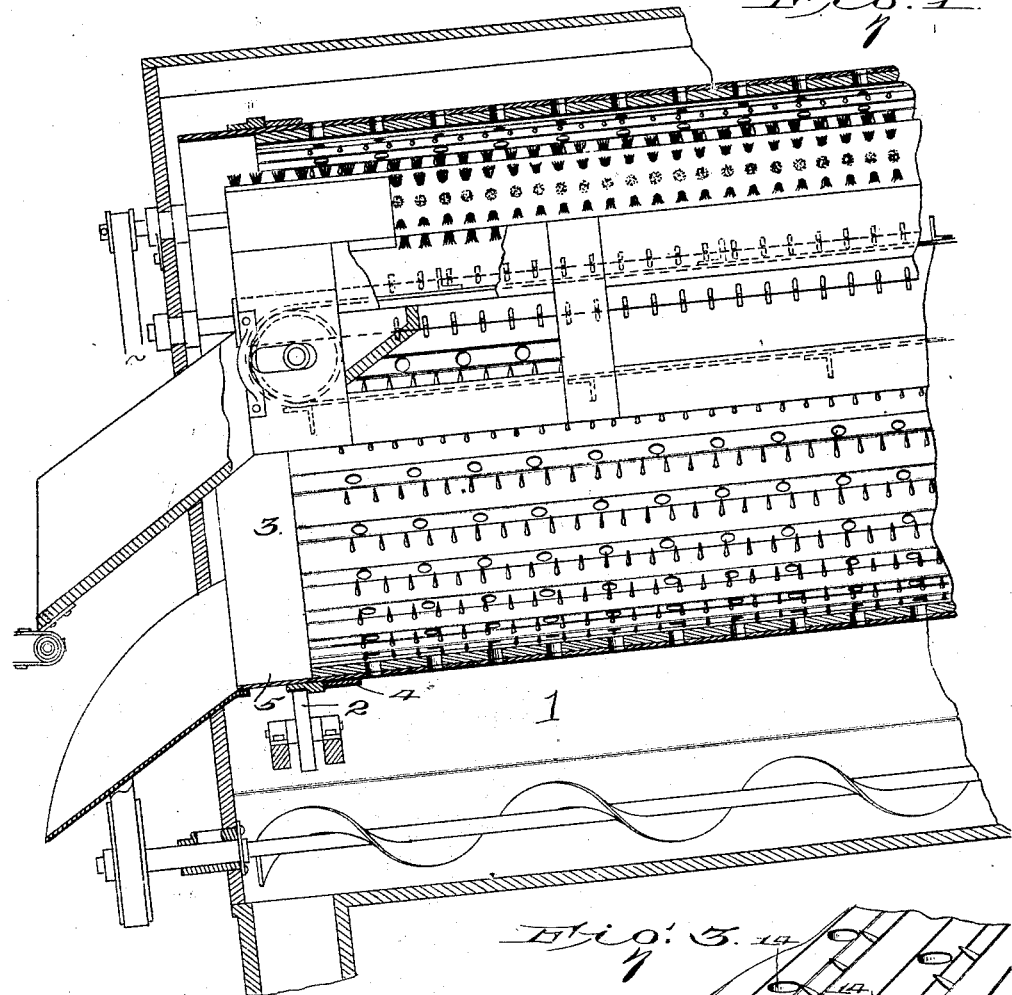
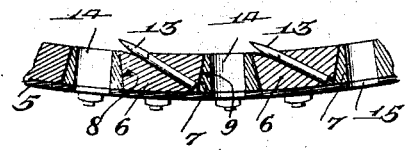
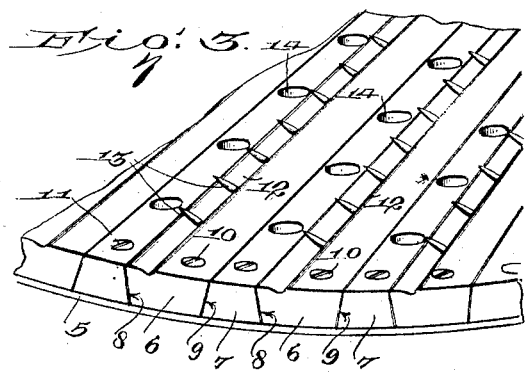
WITNESSES
INVENTOR
V. D. Harlan
BY
ATTORNEYS Patented Nov. 30, 1926.

1,608,653

UNITED STATES PATENT OFFICE.

VAN DON HARLAN, OF HUMPHREY, ARKANSAS.

DRUM FOR COTTON CLEANERS.

Application filed February 25, 1926. Serial No. 90,593.

This invention relates to improvements in cotton cleaning machinery, and an object of the invention is to provide an improvement in the slats which compose the interior of the drum, the improvement being particularly adapted to a cotton cleaning machine such as disclosed in my Patent Number 1,533,593 granted April 14, 1925.

Other objects and advantages appear in the following specification, reference being had to the accompanying drawing, in which Figure 1 is a longitudinal section of a portion of a cotton cleaning machine illustrating the use of the improved drum, Figure 2 is a detail cross section illustrating the alternating arrangement of spiked and unspiked slats.

Figure 3 is a detail perspective view of a portion of the drum again illustrating the arrangement in Figure 2.

Cotton seed as received at a cotton oil mill usually contains a considerable amount of good cotton which has become mixed with the cotton seeds, hulls and other foreign matters. This good cotton can be successfully reclaimed and the improved drum as herein disclosed is designed for the purpose. Cotton received at the cotton oil mill in the foregoing condition is known as "grabot cotton".

The housing 1 supports a sufficient number of rollers 2 on the interior to provide an adequate mounting upon which the drum, generally indicated 3, is revoluble by means of a belt 4 and associated driving means fully disclosed in the patent referred to. The belt is applied to the drum casing 5 as shown, the drum casing being used as a base for a noval arrangement of slats on the interior.

Figures 2 and 3 illustrate the alternating arrangement of spiked and unspiked slats 6 and 7. Opposite longitudinal walls of each of these are tapering as at 8 and 9 thereby making better joints between slats when all are fitted in place than if it were attempted to make the same walls otherwise. Bolts 10 and 11 are used to secure the respective slats in place. The heads of the bolts are countersunk in the surfaces of the slats appearing on the interior of the drum 3 so that none of the cotton may catch and collect thereupon.

Grooves 12 running longitudinally of the slats 6 along one edge mark the places where the sharpened ends of spikes 13 protrude. The grooves are of an exaggerated V-shape, and the spikes enter the slats at one wall of the V. The slats 7 do not have spikes, but are provided with perforations 14 which register with perforations 15 in the drum casing 5 for the purpose of permitting matter foreign to the salvaged cotton to drop through where it is disposed of by a suitable conveyor.

In operation the so-called "grabot cotton" is introduced at one end of the revolving drum 3. The sharp spikes 13 catch and separate the cotton from the seeds, hulls, etc. and carry it up to a point where it is disposed of by means fully disclosed in the patent mentioned. Matter foreign to the salvaged cotton drops through the registering perforations 14 and 15, but it may be stated that in some instances the perforated slats 7 can be dispensed with. In such instances the spiked slats 6 are moved close together with no spaces or perforations between them. In practice the slats are usually made of wood, the manufacture thereof being both relatively simple and comparatively cheap. The fastening of the various slats within the drum casing 5 is readily accomplished so that the manufacture of a drum does not remain an elaborate undertaking.

While the construction and arrangement of the improved drum is that of a generally preferred form, obviously modifications and changes may be made without departing from the spirit of the invention or the scope of the claims.

Having thus described the invention, what I claim is:

1. A drum for the purpose described comprising a drum casing, a plurality of spiked slats, a plurality of unspiked slats, and means by which the slats of both kinds are secured on the interior of the drum casing in alternation.

2. A drum for the purpose described comprising a perforated drum casing, a plurality of slats having perforations matching the perforations in the casing, and a plurality of spiked slats arranged in alternation with said perforated slats.

3. A cotton cleaning machine drum having a plurality of slats on the interior, determined ones of the slats being composed of an elongated strip of material having a groove along one surface thereof, and spikes introduced into said material along one wall of the groove leaving the sharpened ends protruding slightly above said surface of the slat and extending substantially to one edge of said slat.

4. A drum for cotton cleaning machinery having a perforated slat, a complementary slat having a groove along one surface thereof the opposite and opposing walls of said slat being tapering to make an effective joint, and a plurality of spikes introduced into said groove, the points of said spikes being disposed slightly above the surface of the respective slats.

VAN DON HARLAN.